BIDIRECTIONAL SERVOMOTOR SHAFT POSITIONING MEANS

Filed Dec. 28, 1955 3 Sheets-Sheet 1

INVENTOR.
HORST M. SCHWEIGHOFER
BY Moody and Goldman
ATTORNEYS

Nov. 19, 1957 H. M. SCHWEIGHOFER 2,814,013

BIDIRECTIONAL SERVOMOTOR SHAFT POSITIONING MEANS

Filed Dec. 28, 1955 3 Sheets-Sheet 2

INVENTOR.

HORST M. SCHWEIGHOFER

BY Moody and Goldman

ATTORNEYS

Nov. 19, 1957 H. M. SCHWEIGHOFER 2,814,013

BIDIRECTIONAL SERVOMOTOR SHAFT POSITIONING MEANS

Filed Dec. 28, 1955 3 Sheets-Sheet 3

INVENTOR.

HORST M. SCHWEIGHOFER

BY Moody and Goldman

ATTORNEYS

United States Patent Office 2,814,013

Patented Nov. 19, 1957

2,814,013

BIDIRECTIONAL SERVOMOTOR SHAFT POSITIONING MEANS

Horst M. Schweighofer, Cedar Rapids, Iowa, assignor to Collins Radio Company, Cedar Rapids, Iowa, a corporation of Iowa Application December 28, 1955, Serial No. 555,890

12 Claims. (Cl. 318—467)

This invention relates to bidirectional control for the output shaft of an electromechanical shaft positioning mechanism utilizing binary code operation.

The invention is an improvement on the basic binary coding system taught in Patent No. 2,676,289 to A. H. Wulfsberg and H. M. Schweighofer, which is an improvement on the basic system taught in Patent No. 2,476,673 to R. W. May and H. M. Schweighofer. These patents teach systems which provide only unidirectional rotation for their output shafts.

The present invention utilizes a discovery of mine which indicated a correlation between the direction of rotation of the output shaft and the direction of current flow in the control wires of the binary system taught in Patent No. 2,676,289, cited above, when the control wires are given a control sequence according to their binary weight.

Briefly, the known binary scheme teaches how a control switch may be connected to control the position of a remote shaft according to the following expression:

$$P=2^n \qquad (1)$$

where P is the maximum number of discrete rotational positions obtainable for the output shaft, and $n$ is the number of control wires connecting the control station to the remote station. In addition, a power wire is connected between both stations, and a ground connection is provided at each station, although another wire connecting to each station may be substituted for the ground connections.

In general, the control wires of the binary system may be assigned binary weights, such as, $2^0, 2^1, 2^2 \ldots 2^{(n-1)}$, depending on the type of switching means that terminates both ends of the control wires. The type of switching means is taught in the above cited patents.

The present invention utilizes a sequencing arrangement among the control wires to obtain the designated bidirectional properties, wherein control of the system is determined, at any one time, only by the current polarity in one of the control wires. The energized control wire having the greatest binary weight first assumes control of the system; and when current flow ceases in this wire, the control wire having the next greatest binary weight assumes control, and so on until there is no current flow in any of the control wires.

The invention senses by "numerical direction," that is, it senses either in a direction that increases numerically, or in a direction that decreases numerically within a given gamut of numbers, determined by the binary weights of the control wires. For example, if the numbers are 0 through 15, the invention will sense bidirectionally within this range; and, therefore, it will not directly go from 15 to 0 or vice-versa. Thus, the invention can go directly from position 12 to either of adjacent positions 11 or 13 without backtracking or first going to a homing position.

Prior unidirectional sensing devices, such as those in the above cited patents, will sense in only one direction, such as the numerically increasing direction. Thus, they can go directly from position 12 to adjacent position 13 but cannot go directly from position 12 to adjacent position 11, because this requires movement in the opposite direction. In the latter case, a unidirectional device must first go from position 12 up to terminal position 15 and then back to zero, which is the starting or homing position, and finally must go up the gamut of numbers until it reaches the desired position 11. It is, therefore, apparent that in some cases, a bidirectional system can obtain a large saving in shaft positioning time over a unidirectional system.

Whether numerical sensing can provide the shortest actual amount of travel depends upon the particular ulitization of the shaft positioning system. Assume, for example, that a rod is driven by the rotating output shaft of the shaft positioning means through a gear and rack arrangement, or through a lead screw arrangement. Such arrangements are important in positioning the tuning slug of a variable inductance, and in adjusting the tuning plunger of a cavity resonator, wherein the numerical sequence correlates with tuned frequency. For example, numbers may be indicated consecutively along the rod from 0 to 15 with 0 near one end and 15 near the opposite end. It will be found that the shortest distance between any two numbers along the rod will correlate with the type of bidirectional numerical sensing provided by this invention. Furthermore, the bidirectional system will not drive the rod beyond its end numbers, and, therefore, cannot move the rod out of its supporting means.

In prior unidirectional systems, a rod as described above, can sense in only one direction; and when the rod reaches its end in the sensing direction, it must strike a reversing limit switch that causes the rod to be moved to the opposite end, which is the homing position from which it begins its unidirectional sensing journey. Accordingly, in such prior system, the rod may sense in an increasing numerical direction or vice-versa, but not both. It is consequently apparent that the sensing time for the unidirectional linear system is, on the average, much greater than the sensing time required with a proper bidirectional system for sensing linearly, such as along the length of a straight rod.

On the other hand, there are some exceptions where bidirectional numerical sensing does not decrease the amount of travel. This can occur where the terminal numbers of the system are adjacent to each other. An example is, where the digits zero through 15 are equally spaced about the circumference of a circle. It is, hence, apparent that position zero is adjacent to position 15, and, accordingly, it is more direct to go from position 15 to zero rather than to sense directly from position 15 through positions 14, 13, etc. down to position zero.

However, this exception does not apply when numerical sensing occurs on less than one-half of the circumference of the circle. Now, assume that the digits 0 through 15 are equally spaced within a semicircle. It is again apparent that it is shorter to go from position 15 through positions 14, 13, etc. to 0 rather than to go unidirectionally around the circumference from position 15 to position zero.

It is, accordingly, the primary object of this invention to provide a binary shaft positioning system that senses bidirectionally with respect to a given numerical sequence.

It is a feature of this invention to provide in a binary shaft positioning system a plurality of current sensing means which operate with the respective control wires of the system. Each current sensing means senses the current flow direction in a particular control wire, and is sequentially selected to control the direction of rotation of a reversible motor, wherein motor direction corresponds to the sensed direction of current flow in the sequentially selected control wire.

Thus, the energized control wire having the greatest binary weight may be first given control of the system until its current flow ceases, then the energized control wire having the next lowest binary weight takes over control until its current flow ceases, and so on until current no longer flows in any of the control wires.

Further objects, features and advantages of this invention will become apparent to a person skilled in this particular art upon further study of the specification and drawings; in which, Figure 1 illustrates schematically one form of the invention;

Figure 1:
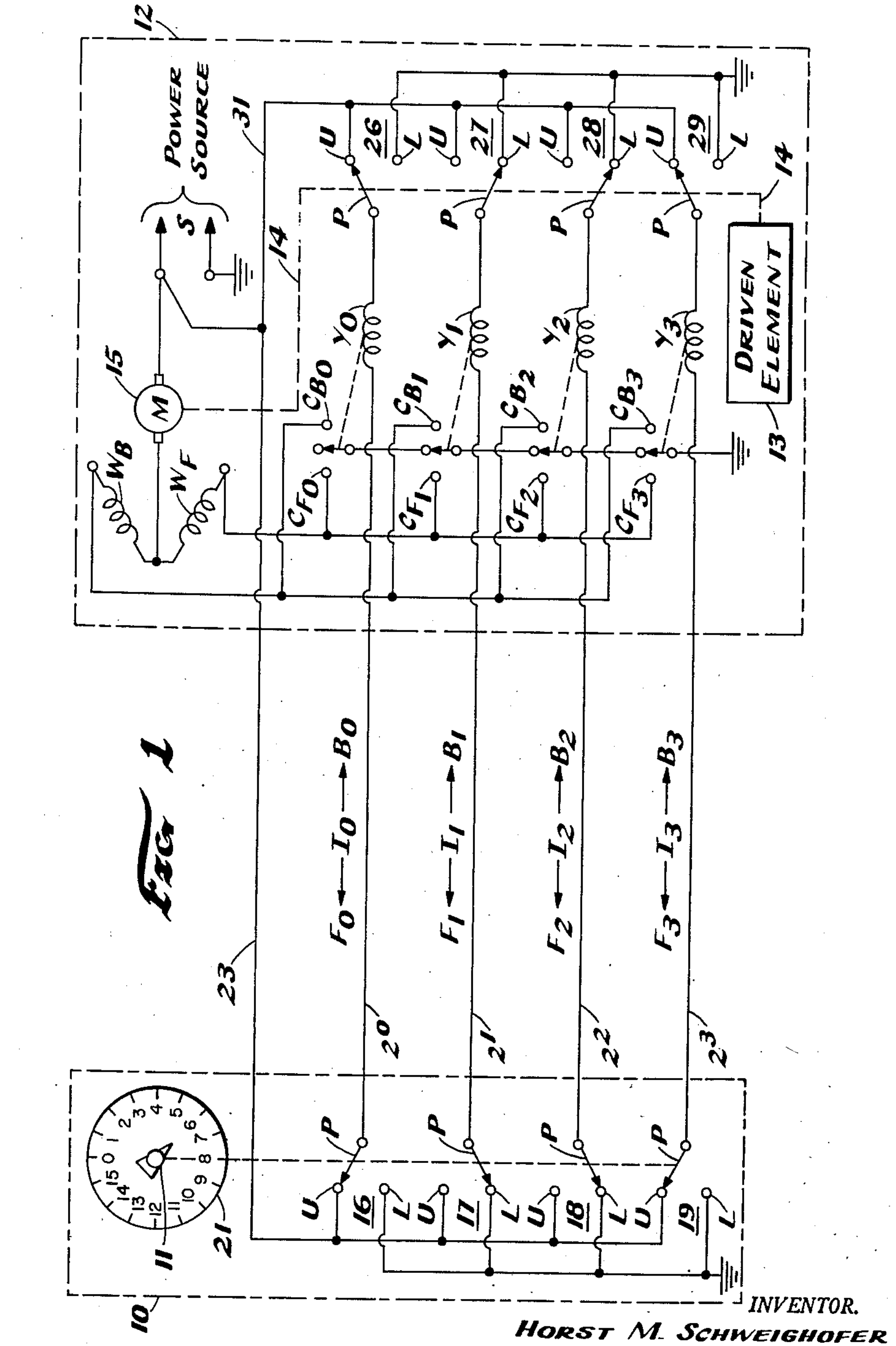

Now referring to the invention in more detail, Figure 1 shows a form of this invention utilized with a binary shaft positioning mechanism of the type described in Patent No. 2,676,289 cited above. The invention includes a plurality of polarized relays $Y_0$, $Y_1$, $Y_2$, and $Y_3$ respectively connected in series with a plurality of control wires $2^0$, $2^1$, $2^2$, and $2^3$, which represent the binary weights of the wires in their relationship to the system.

The system has: a control station 10, which may be operated by a control knob 11; and a remote station 12, which actuates a driven element 13 through an output shaft 14 that is driven by a reversible motor 15, which has split-field windings which are arbitrarily designated as a backward direction winding $W_B$ and a forward direction winding $W_F$.

In control station 10, control knob 11 operates a plurality of single-pole double-throw switches 16, 17, 18 and 19, which may be constructed according to the teachings of the above cited patents. For example, the control switch might be comprised of single-pole double-throw switches actuated by a cam mechanism to provide the required permutation of connections as taught in detail in Patent No. 2,476,673; or it might be a double-layer rotary tap switch constructed as also taught in Patent No. 2,476,673; or, furthermore, it might be a single-layer rotary tap switch constructed as taught in Patent No. 2,676,289. In any of these cases, the overall switching sequence is the same when constructed properly.

In Figure 1, the control switch has upper contacts U connected to a power source S by a power lead 23. Similarly, the lower contacts L of the control switch are connected to ground. The poles P of the control switch connect respectively to one end of the control wires $2^0$, $2^1$, $2^2$ and $2^3$.

The system has a seeking switch that may be constructed identically to the control switch described above. Thus, the seeking switch may be comprised of a plurality of single-pole double-throw switches 26, 27, 28 and 29 with their poles P respectively connected to the other end of the control wires; wherein each single-pole switch has its upper contacts U connected by a lead 31 to power source S, and has its lower contacts L connected to ground. The seeking switch is driven by reversible motor 15 through shaft means 14.

Each of the polarized relays $Y_0$ through $Y_3$ includes a single pole and three contacts with the pole engaging the center contact when the relay is not energized. When any of the relays is energized with forward-direction current (which is indicated in Figure 1 by the arrow marked F), its pole engages the respective contact $C_F$; and when energized by a backward-direction current (as indicated by the arrow marked B), the pole engages the respective contact $C_B$.

Motor 15 is series connected with its windings $W_F$ and $W_B$ and has one side connected to power source S. When a circuit is completed through field winding $W_F$ motor 15 rotates output shaft 14 in a forward direction; and when a circuit is completed through second field winding $W_B$, motor rotates shaft 14 in a backward direction. Control shaft 14 can be set to any of sixteen discrete positions by positioning control knob 11 at any of those positions which are indicated on a dial 21 as positions 0 through 15.

Each of the relay contacts $C_F$ is connected to the remaining side of field winding $W_F$. And similarly, each of the relay contacts $C_B$ is connected to the remaining side of field winding $W_B$.

The pole of relay $Y_3$ is connected to ground, and its center contact is connected to the pole of relay $Y_2$. In a like manner, the center contact of relay $Y_2$ is connected to the pole of relay $Y_1$, and the center contact of relay $Y_1$ is connected to the pole of relay $Y_0$.

Each of the control wires $2^0$, $2^1$, $2^2$ and $2^3$ is assigned a different binary weight in the indicated manner. The weighting of each wire is determined by the switching sequence of the single-pole double-throw switches connected at opposite ends of the wire. The following table and explanation teaches how the switching arrangement relates to the assigned binary weighting of the control wires. The table illustrates a switching arrangement for one binary system having four control wires. However, it will later be obvious, that this table may be extended or altered for a binary system having any number of control wires.

*Table*

| Control Shaft Position | Wire End Connections At Control Switch | | | | | Seeking Shaft Position | Wire End Connections At Seeking Switch | | | | |
|---|---|---|---|---|---|---|---|---|---|---|---|
| | $2^3$ | $2^2$ | $2^1$ | $2^0$ | | | $2^3$ | $2^2$ | $2^1$ | $2^0$ | |
| 0 | S | S | S | S | | 0 | S | S | S | S | |
| 1 | S | S | S | G | | 1 | S | S | S | G | |
| 2 | S | S | G | S | | 2 | S | S | G | S | |
| 3 | S | S | G | G | | 3 | S | S | G | G | |
| 4 | S | G | S | S | S—G | 4 | S | G | S | S | B ↓ |
| 5 | S | G | S | G | → B | 5 | S | G | S | G | ↑ ↓ |
| 6 | S | G | G | S | | 6 | S | G | G | S | ↑ ↓ |
| 7 | S | G | G | G | G—S | 7 | S | G | G | G | ↑ F |
| 8 | G | S | S | S | F ← | 8 | G | S | S | S | |
| 9 | G | S | S | G | | 9 | G | S | S | G | |
| 10 | G | S | G | S | | 10 | G | S | G | S | |
| 11 | G | S | G | G | | 11 | G | S | G | G | |
| 12 | G | G | S | S | | 12 | G | G | S | S | |
| 13 | G | G | S | G | | 13 | G | G | S | G | |
| 14 | G | G | G | S | | 14 | G | G | G | S | |
| 15 | G | G | G | G | | 15 | G | G | G | G | |

In the table, S means that the designated end of the given control wire is connected to the power source; and G means that the designated end of the given control wire is connected to ground. The number of positions may be determined by Formula 1 given above, which, for a four-wire system, provides a maximum of 16 positions, which in the table range from positions zero through 15. The wires are weighted as indicated at the top of each column marked with the binary weight of the control wires.

The switching sequence provided at the ends of the various control wires accordingly may be noted from observing the vertical columns representing the control wires in the table. It is noted that the sequence of connections provided at opposite ends of a given control wire are the same; and, therefore, the control switch may be made identical to the seeking switch. It is, therefore, seen from the vertical column of control wire $2^0$ (which equals one) that each of its ends are switched in a sequence of one position connected to source S, and one position connected to ground G. It is further noted from the column of the wire weighted $2^1$ (which equals 2) that its ends are switched in a sequence of two adjacent positions connected to source S, and then two adjacent positions connected to ground G, and so on. For the wire weighted $2^2$ (which equals four), the switching sequence is four adjacent positions connected to the source S, and then four adjacent positions connected to ground G, and so on. The last wire that is weighted $2^3$ (which is equal to eight), has eight consecutive positions connected to the source followed by eight consecutive positions connected to ground.

Where the system uses more than four control wires, the switching device provided at each end of a control wire will provide a connection to source S for $2^K$ consecutive rotational positions followed by a connection to ground G for $2^K$ consecutive positions, and so on until the total number of rotational positions for the system is used, wherein $2^K$ is the binary weight of the given wire.

In the table, the steady-state connections provided at any one of the sixteen positions are directly obtainable by looking across the horizontal row aligned with the given position. It can be seen that in any steady-state position, both ends of such control wire are connected to the same potential, it being either source S or ground G.

A transient state occurs when the control shaft position is different from the seeking shaft position, in which case current flows in at least one of the control wires to cause motor rotation. This also can be observed from the table, because it will here be noted that at least one wire will have different potentials, G and S, at opposite ends.

Furthermore, the direction of current flow in any of the control wires may be also determined from the table; and the horizontal arrows having the S—G and G—S notations are provided for this purpose. Horizontal arrow S—G is marked B and indicates the backward-current direction. It is selected when the given wire is connected to the source S, at its control switch end, and is connected to ground at its seeking switch end. The notation S—G means that the arrow applies when S is found on the left hand side of the table which indicates the connection at the control switch end, and G is found on the right hand side of the table which indicates the connection at the seeking switch end.

In a like manner, horizontal arrow G—S is marked F and indicates the forward-current direction. It is selected when the given wire is connected to ground G at its control switch end, and is connected to source S at its seeking switch.

Thus, it is the order of connection of the ends of the wires to opposite potentials G and S that determines the direction of current flow, and this is indicated according to the F or B markings of the arrows.

The use of the table may be illustrated by an example: Assume that initially both the control switch and the seeking switch are at steady-state position 4, and that it is desired to rotate the output shaft to steady-state position 11. To do this, the control switch is first moved to position 11. It is noted by comparing the wire connections at the control switch end for position 11 to the wire connections at the seeking switch end for position 4 that the $2^3$ control wire is now connected to ground G at its control switch end and remains connected to source S at its seeking switch end. Accordingly, the G—S order of notation results which selects horizontal arrow F in the table, which specifies that forward-direction current now flows in wire $2^3$. Forward-direction current $I_3$ passing through polarized relay $Y_3$ causes its grounded pole to engage its contact $C_{F3}$ which provides a circuit through forward winding $W_F$ of motor 15 that causes it to rotate output shaft 14 and the seeking switch in the forward direction.

The sequence of connections occurring at the seeking switch end of the $2^3$ control wire, as the seeking switch is rotated in the forward direction by the motor and will carry it from position 4 toward position 11. This direction of seeking switch travel is indicated in the table by the vertical arrow F.

It can be observed from Figure 1 that when the pole of relay $Y_3$ engages contact $C_{F3}$, the poles of the other relays $Y_2$, $Y_1$ and $Y_0$ no longer can provide a connection to ground. Therefore, currents passing through and actuating relays $Y_2$, $Y_1$ and $Y_0$ cannot affect the operation of the system since they cannot complete any circuit. Thus, while energized, only relay $Y_3$ can control motor rotation.

Relay $Y_3$ will be energized until the seeking switch rotates to position 8, where both ends of control wire $2^3$ become connected to ground, and current can no longer flow through it to energize relay $Y_3$. Then, the pole of relay $Y_3$ engages its center contact to thereby ground the pole of relay $Y_2$. But in position 8, wire $2^2$ has both ends connected to the source S; and, accordingly, no current flows through it to energize its relay $Y_2$, and its pole engages its center contact to ground the pole of the next relay $Y_1$. In position 8, wire $2^1$ connects to ground G on the left and to source S on the right, which again indicates forward current. Thus, the pole of relay $Y_1$ engages forward contact $C_{F1}$ which again connects motor winding $W_F$ to ground to continue forward rotation. At position 10, relay $Y_1$ becomes de-energized because now both ends of wire $2^1$ connect to ground, so that it no longer carries a current.

However, in position 10, the remaining wire, which is weighted $2^0$, is connected to ground G on the left and is connected to source S on the right to again provide a current flow in the forward direction. Thus, the pole of relay $Y_0$ engages its contact $C_{F0}$ to again connect motor winding $W_F$ to ground and continue forward rotation of motor 15 which rotates the seeking switch.

When the seeking switch arrives at position 11, which is also the position of the control switch, wire $2^0$ de-energizes, since both of its ends are then connected to ground; and finally no current flows through any of the wires. Hence, the seeking switch and output shaft have arrived at a steady-state position after traveling in the forward direction from position four to position 11.

Assume now that it is desired to change the position of output shaft 14 from position 11 to position 9, which will obtain backward rotation. The control switch is moved to position 9; and it is then noted that no current flows through either wires $2^3$ or $2^2$, since there is no difference of potential between their opposite ends. However, wire $2^1$ has its left end in Figure 15 connected to source S and its right end connected to ground G, which causes backward-current flow as indicated by horizontal arrow B. Hence, the poles of relays $Y_3$ and $Y_2$ continue to engage their center contacts to thereby ground the pole of relay $Y_1$, which engages contact $C_{B_1}$ and rotates motor 15 in a backward direction. Furthermore, the sequence of connections by the seeking switch is indicated in the table by following the horizontal rows in the seeking switch columns in the direction of vertical arrow B as the seeking switch moves from position 11 to position 9. When the seeking switch reaches position 9, both ends of wire $2^1$ become connected to the source S; and, accordingly, its current flow discontinues. At position 9, there is no current flow through any of the wires, and, hence, a steady-state position exists.

Any sequence of operation may be explained in the same manner as above to prove the bidirectional operation of the invention.

Figure 2:
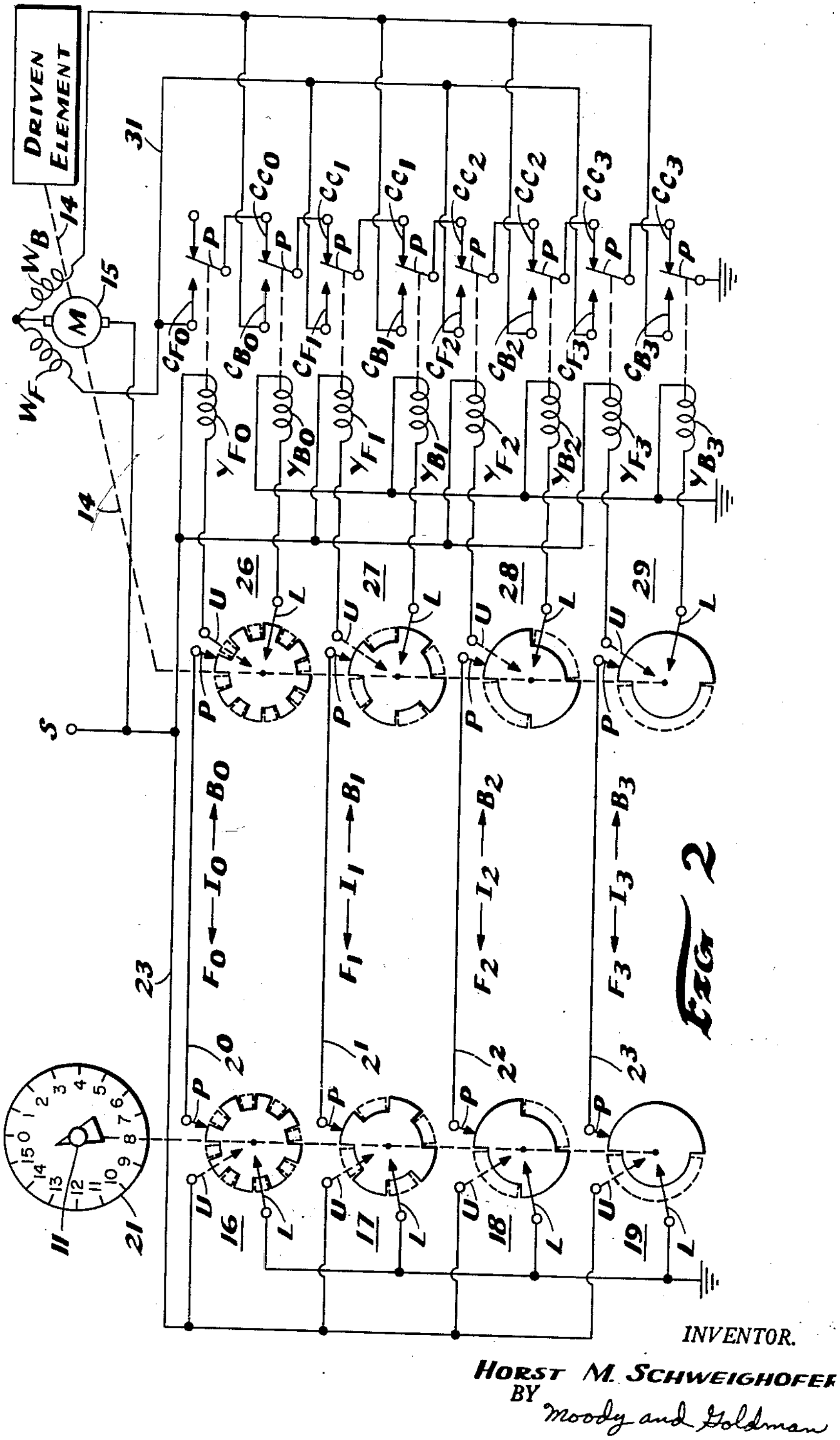
Figure 2 shows a schematic diagram of another form of the invention.

The form of the invention shown in Figure 2 utilizes the same basic principles that were used and explained in connection with Figure 1. However, Figure 2 uses non-polarized relays instead of the polarized relays of Figure 1. The other elements in Figure 2 are the same, or are equivalent to elements illustrated in Figure 1, and are given the same reference numerals. Also, the same general binary wire scheme is used, as is taught in Patent No. 2,676,289 cited above.

Thus, the switching arrangement of Figure 2 is the same as in Figure 1; and although the specific type of switches appear different, they are basically the four single-pole double-throw switches shown in Figure 1 and are combined into wafer-switch form. Wafer-switch arrangements of this type are described in Patent No. 2,476,673, and, therefore, will not be described in detail herein. Briefly, each single-pole double-throw switch comprises a double-layer wafer switch, wherein the periphery in solid lines represents a contacting part of the rotor on one side of each wafer; and the periphery in dotted lines represents the contacting part of the rotor on the opposite side of each wafer, and the two rotor portions are insulated from each other.

The stator of each wafer switch comprises three contacts, wherein a pole contact P engages the periphery of the rotor and is capable of contacting both the dotted line and solid line peripheries in Figure 2. Contacts L, in solid lines are connected to ground G, and make continuous sliding contact with one side of the rotor, comprising the periphery shown in solid lines; while contact U, shown in dotted lines, are connected to source S by lead 23 and make continuous sliding contact with the opposite side of the rotor, comprising the periphery shown in dotted lines. The control wires $2^0$ through $2^3$ in Figure 2 are provided with a weighting arrangement exactly as in Figure 1; and the weighting arrangement is obtained by controlling the peripheries of the wafer switches to follow the switching scheme explained in connection with the table above. Accordingly, the dotted stator contact U of each wafer switch is connected in series with the power source S; and the solid stator contact is connected in series with ground G. Thus, the pole P of each wafer switch is switched between two contacts L and U in single-pole double-throw fashion (which occurs as the rotor periphery is rotated) in the same manner as explained in connection with Figure 1.

Eight single-pole double-throw relays of the non-polarized type are shown in Figure 2. They are relays $Y_{B_3}$, $Y_{B_2}$, $Y_{B_1}$ and $Y_{B_0}$ that connect respectively between ground and solid line contacts L of the seeking switch; and relays $Y_{F_3}$, $Y_{F_2}$, $Y_{F_1}$ and $Y_{F_0}$ that connect respectively between power source S and the dotted line contacts of the seeking switch.

In the order shown in Figure 2, the normally-closed contact $C_c$ of each of the relays is connected in series with the pole of the adjacent relay. The pole P of relay $Y_{E_3}$ is connected to ground and its normally-closed contact $C_{c_3}$ connects to the pole P of relay $Y_{F_3}$.

On the other hand, the normally-open contacts $C_{F_3}$, $C_{F_2}$, $C_{F_1}$ and $C_{F_0}$ of the respective source-connected relays $Y_{F_3}$, $Y_{F_2}$, $Y_{F_1}$ and $Y_{F_0}$ are connected in series with the forward-direction winding $W_F$ of motor 15. In a similar manner, the normally-open contacts $C_{B_3}$, $C_{B_2}$, $C_{B_1}$ and $C_{B_0}$ of the source-connected relays $Y_{B_3}$, $Y_{B_2}$, $Y_{B_1}$ and $Y_{B_0}$ are connected in series with the backward-direction winding $W_B$ of motor 15.

The principle of operation of the system in Figure 2 may also be analyzed with the use of the table given above. Similarly, when using the table in regard to Figure 2, forward horizontal arrow G—S indicates an actuation of a respective forward relay $Y_F$, which operates motor 15 in a forward direction; and backward horizontal arrow S—G in the table indicates an actuation of a respective backward direction relay $Y_B$, which operates motor 15 in the backward direction. This follows from the particular current flows obtained at the various transient switch positions.

Control is again maintained according to the weighted sequence of the wires, since any particular relay can only actuate motor 15 when its pole is grounded; and this can occur only when relays of a higher weight are not energized.

Figure 3:
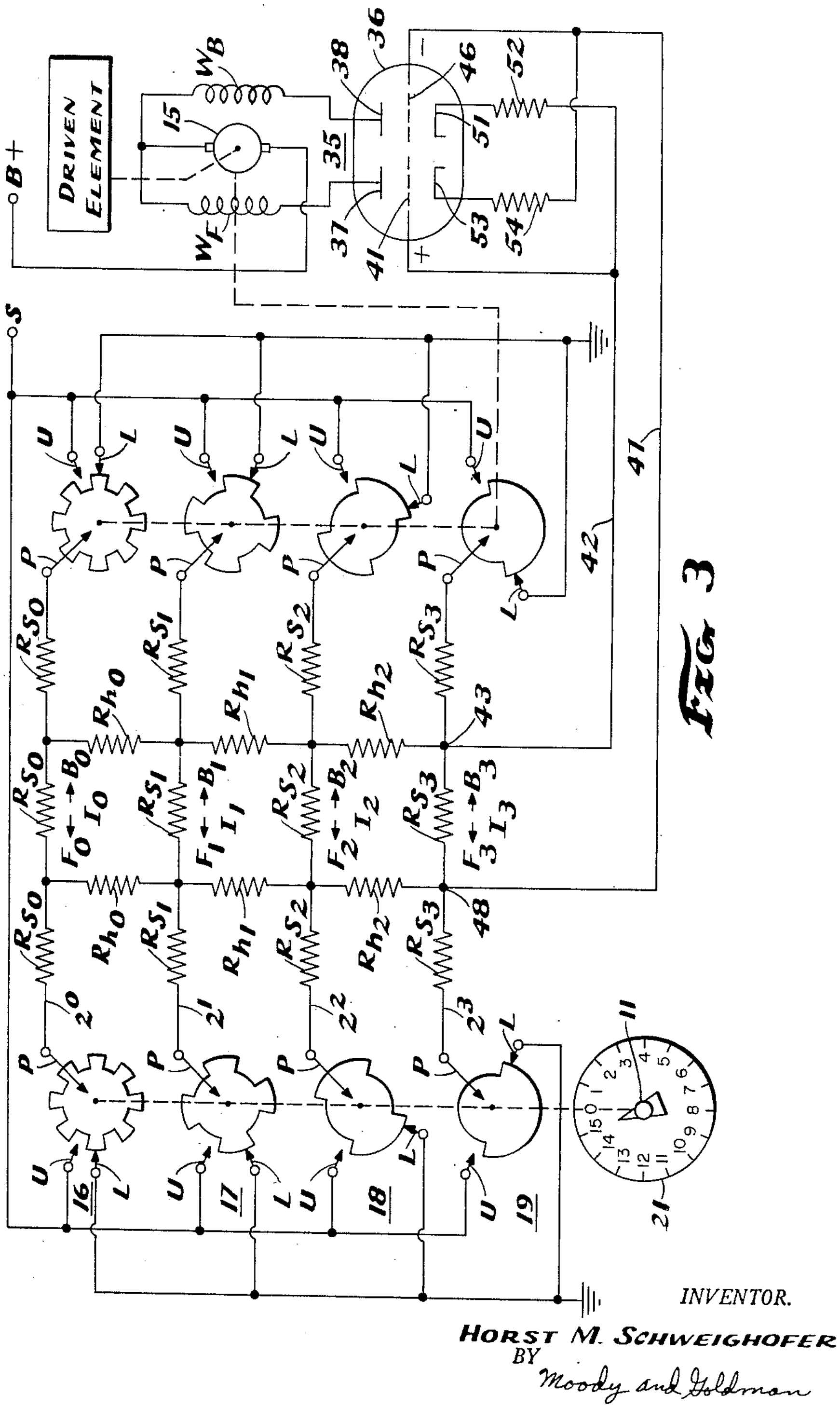
Figure 3 is a schematic diagram of still another form of the invention.

The form of the invention shown in Figure 3 illustrates a system which is basically similar to the systems of Figures 1 and 2. However, Figure 3 utilizes electron-tube switching means, and a matrix network to sense the current direction in wires according to a desired sequence. Like elements are given the same reference numerals in Figure 3 as were given in Figure 1. The basic switching arrangement and the particular type of wafer switches are taught in Patent No. 2,676,289, which is a unidirectional system. It is noted that the wafer switches in Figure 3 have a different periphery arrangement than the wafer switches in Figure 2, wherein in Figure 3 a single rotor is used for each single-pole double-throw switch and is continuously engaged by its pole P. Contacts U and L in Figure 3 are stator contacts that engage the periphery of their respective rotors.

The resistor matrix network senses current directions in the respective control wires in a required sequence to actuate an electron tube switch 35 that controls the direction of motor rotation. Each control wire has three resistors $R_s$ connected in series with it; and a cross-network of resistors $R_h$ that are connected in shunt between the ends of adjacent center resistor $R_s$ in Figure 3.

Again series motor 15 is provided with forward winding $W_F$ and backward winding $W_B$. The electronic switching device in Figure 3 has a dual triode 36, which has one plate 37 connected serially to motor winding $W_F$ and has another plate 38 connected serially to motor winding $W_B$.

The motor connects serially to a B plus power supply, while the source S will often be a much smaller D. C. voltage and may have negative polarity. One control grid 41 is connected by a lead 42 to point 43 which is at one end of the center resistor $R_s$ of the highest weighted wire $2^3$. Similarly, the other control grid 46 is connected by a lead 47 to another point 48 which is at the other end of the same series resistor $R_s$ of control wire $2^3$. One cathode 51 is cross connected through a biasing resistor 52 to the opposing control grid 41; and in a similar manner, the other cathode 53 is cross-connected through a biasing resistor 54 to its opposite control grid 46.

As stated above, the operation of the system in Figure 3 is similar to the operation of the system illustrated in Figure 1; and the table may again be used in analyzing the operation of the form of the invention in Figure 3.

If a forward current $F_3$ flows through wire $2^3$, point 48 will be negative with respect to the other point 43. This will make control grid 46 negative with respect to its cathode 51 to cut off current flow through the right-hand triode in Figure 3, and will make the other control grid 41 positive with respect to its cathode 53 to cause conduction through the left-hand triode. Therefore, current flows only through the motor winding $W_F$ to cause forward direction motor rotation.

On the other hand, if a backward current $B_3$ flows through wire $2^3$, conduction will then occur through the right hand triode to accordingly energize motor winding $W_B$, which will cause backward motor rotation.

It is, therefore, apparent that the polarity of the voltage between points 43 and 48 controls the direction of motor rotation.

Nevertheless, when no current flows through the control wires, there is no difference of potential between points 43 and 48, and small but equal currents may flow through motor windings $W_F$ and $W_B$ to cause counter-rotational forces in motor 15 that prevent rotation.

The system of Figure 3 operates as follows: The energized control wire having the highest binary weight controls the voltage at points 43 and 48 because it is less isolated from these points by shunt resistors $R_h$ than energized control wires having a smaller binary weight. When current flows through control wire $2^3$, which has maximum binary weight, it will have sole control over switching tube 36, because voltages which may exist across the series resistors $R_s$ of other control wires are isolated by shunt resistors $R_h$ from points 43 and 48. However, when no current flows through wire $2^3$ the potential difference between points 43 and 48 is controlled by the potential difference across the center resistor $R_s$ of the control wire of next highest weight, which may be the $2^2$ control wire. Then, a potential difference, occurring across the center series resistor $R_{s_2}$ of control wire $2^2$ will be transmitted, with some attenuation through the intermediate shunt resistors $R_{h_2}$ to points 43 and 48 from which tube 36 is actuated in the required manner.

Similarly, when control wire $2^1$ has current flow, and wires $2^3$ and $2^2$ do not, the potential, across its center resistor $R_{s_1}$, will be transferred (with some attenuation) through the intermediate shunt resistors $R_{h_1}$ and $R_{h_2}$ to provide the control potential at points 43 and 48. Likewise, when current flows in the lowest weighted control wire, which is $2^0$ in Figure 3, and when the other wires are not energized, the potential across its center resistor $R_{s_0}$ will similarly be transferred by shunt resistors $R_{h_0}$, $R_{h_1}$ and $R_{h_2}$ to control points 43 and 48 to control motor rotation.

As stated above, when several wires are energized at a particular time in Figure 3, it is only the wire having the highest weight which will control the potential at control points 43 and 48, because the control wires of lesser weight are more isolated from these control points by intermediate shunt resistors.

There will be a variation in the amount of control grid voltage provided at control points 43 and 48 due to the variation in isolation of the various control wires from these points. The cathode resistors 52 and 54 assist in regulating the control grid bias so that it will not vary as widely as the variation of potential at control points 43 and 48. The regulation occurs because the voltage-drop across the cathode resistor of the activated triode increases with increased voltage between points 43 and 48 to correspondingly decrease the bias on the respective tube.

The series resistors $R_s$, on both sides of each center series resistor $R_s$, control the amount of voltage appearing across the center resistor by a voltage divider relationship. Also, the side resistors $R_s$ have a series relationship to the plate currents of tube 36 and, therefore, tend to limit the amplitude of the plate currents.

Many variations of the arrangement of Figure 3 are possible. For example, the values of the matrix resistors need not be equal but often will be proportioned according to the amount of isolation that exists between them and the control points 43 and 48.

Also, a bias arrangement may be provided for the triodes wherein the triodes are biased below cutoff when control points 43 and 48 are at the same potential which occurs when the system is in a steady state position.

Still another alternative arrangement is to connect relays where the motor windings are shown in Figure 3 and let the relays operate the motor.

It is also possible to use a motor with a single field winding rather than a motor having the double-field windings shown in Figures 1, 2, and 3. This can be accomplished by connecting the single winding between plates 38 and 37 of the triodes and by connecting plate resistors to the tubes in place of the windings $W_F$ and $W_B$ shown in Figure 3. The bias on the two triodes has see-saw action in respect to their conduction which in turn will cause the proper polarity of current flow through a single field winding to obtain the required bidirectional operation for the motor.

While direct-voltages are often preferred in the forms of the invention in Figures 1 and 3, either an alternating voltage or a direct-voltage of any polarity can be used with the form of the invention in Figure 2.

The lowest weighted control wire need not be weighted $2^0$, but may theoretically have any binary weight, as for example $2^6$. Furthermore, any number of control wires may be used. It is also possible to skip some of the binary weights in the control wire sequence. Further, the system may be limited to any number of positions less than the maximum number determined by Formula 1 above.

It is, therefore, apparent that this invention provides bidirectional means for a binary shaft positioning system wherein the system directionally senses in the shortest numerical direction.

While several forms of the invention have been shown and described, it will be obvious to a person skilled in this particular art, that the invention is capable of many modifications. Changes, therefore, in the construction and arrangement of this invention may be made without departing from its full scope as given by the appended claims.

I claim:

1. Bidirectional shaft positioning means for a binary shaft positioning system, wherein the output shaft can provide a maximum number of rotational positions equal to $2^n$ in which $n$ represents the number of control wires, a control switch having a plurality of switching elements connected respectively to adjacent ends of said control wires, a seeking switch having the same plurality of like elements connected in the same order to opposite ends of said control wires, each control wire being identifiable by a different binary weight, which is a power of 2, each binary weight being determined by the number of non-switched consecutive positions of the respective control switch, comprising bidirectional driving means coupled to said output shaft, a different current-sensing means connected serially with each of said control wires, and means for selecting the current-sensing means of the energized control wire having the highest binary weight, and means connecting said current-sensing means to said driving means, whereby the direction of rotation of said driving means correlates with the polarity of current received by this sensing means.

2. Bidirectional shaft positioning means comprising, a binary shaft positioning system having control wires of different binary weights, a control switch having a plurality of switching elements connected respectively to adjacent ends of said control wires, a seeking switch having the same plurality of like elements connected in the same order to opposite ends of said control wires, each control wire being identifiable by a different binary weight, which is a power of 2, each binary weight being determined by the number of non-switched consecutive positions of the respective control switch, motor means for providing bidirectional rotation and coupled to the output shaft of said system, and means for respectively energizing said motor means with the same current polarity of the energized control wire having the highest binary weight, whereby said motor means rotates bidirectionally in the direction of shortest numerical distance to the selected position.

3. Bidirectional means for a binary shaft positioning system having a plurality of control wires, comprising, a control switch having a plurality of switching elements connected respectively to adjacent ends of said control wires, a seeking switch having the same plurality of like elements connected in the same order to opposite ends of said control wires, each control wire being identifiable by a different binary weight, which is a power of 2, each binary weight being determined by the number of non-switched consecutive positions of the respective control switch, a motor coupled to the output shaft of said system and having forward and backward field windings, a plurality of polarized relays respectively connected in series with said control wires and designated by the binary weight of their respective control wire, each relay having a single pole and three-position contacts, the center contact of each relay engaged when its respective control wire is de-energized and its opposite-end contacts respectively engaged during opposite polarities of control-wire current, a power source, the poles and the center contacts of said relays respectively connected in series to one side of said power source in the decreasing sequence of their binary weights when all of said control wires are de-energized, said motor connected to the other side of said source, the relay contacts that are engaged during one polarity of control-wire current connected to said forward winding, and the opposite relay contacts that are engaged during the opposite polarity of control-wire current connected to said backward winding.

4. Bidirectional means for a binary shaft positioning system having a plurality of control wires, comprising, a control switch having a plurality of switching elements connected respectively to adjacent ends of said control wires, a seeking switch having the same plurality of like elements connected in the same order to opposite ends of said control wires, each control wire being identifiable by a different binary weight, which is a power of 2, each binary weight being determined by the number of non-switched consecutive positions of the respective control switch, a motor with two field windings each connected in series with its armature, wherein circuits through opposite field windings can cause opposite direction of motor-rotation, a different polarized relay connected in series with each of said control wires, with each relay designated by the binary weight of its control wire, each relay having a single pole and three contacts with its center contact engaged while the relay is unenergized, the pole of the relay of the highest weight being connected to ground, the center contact of each relay connected to the pole of the relay having the next lowest weight, all relay contacts that are engaged during one polarity of control-wire current connected to one of said field windings, all relay contacts that are engaged during the opposite polarity of control-wire current connected to the other of said field windings, whereby the output shaft of said system senses in the shortest numerical direction to the selected position.

5. Bidirectional means for a binary shaft positioning system having a plurality of control wires, comprising, a control switch having a plurality of switching elements connected respectively to adjacent ends of said control wires, a seeking switch having the same plurality of like elements connected in the same order to opposite ends of said control wires, each control wire being identifiable by a different binary weight, which is a power of 2, each binary weight being determined by the number of non-switched consecutive positions of the respective control switch, a motor with split-field windings, wherein separate energization of opposite field-winding portions enables opposite directional rotation of said motor, a plurality of polarized relays each having a single pole and first, second, and third contacts, in which the second contact is normally engaged when the respective relay is de-energized, each relay being serially connected to a different one of the control wires of said binary system, the first contact of each relay being engaged during the same polarity of current flow in said relays, the third contact of each relay being engaged during the opposite polarity of current flow in the respective relays, the first contact of each relay connected to one of said field-winding portions, the third contact of each relay connected to the other of said field-winding portion, the second contact of the relay of highest weight being connected to the pole of the relay of second highest weight, the center contact of said second highest weighted relay connected to the pole of the relay of third highest weight, the same order of connection being provided among the second contacts and poles of the following relays, a power source having one side connected to the pole of the relay of highest weight, said power source having its opposite side connected to said motor, whereby said output shaft senses in both the increasing and the decreasing numerical directions.

6. Bidirectional means for a binary shaft positioning system having a plurality of control wires, wherein the binary system has a seeking switch with a plurality of double-layer wafer switches each having a single periphery contact respectively terminating a different one of said control wires and a pair of sliding contacts that continuously engage opposite sides of the wafer switch, each control wire being identifiable by a different binary weight which is a power of 2, the binary weight being determined by the number of non-switched consecutive angular positions of the respective seeking-switch portion, comprising a plurality of non-polarized relays, each having single-pole double-throw contacts, a different relay being connected in series with each sliding contact to provide a pair of relays connected to each wafer switch, a motor with a pair of field windings, wherein separate energization of the field windings permits opposite rotation of said motor, a power-source terminal connected to said motor, one relay of each pair having its opposite end connected to said power-source terminal, a ground connection connected to the other relay of each pair, said relays being designated according to the binary weight of their respective wafer switches and according to their respective ground and power-source connections, each of said pairs of relays having the normally-closed contact of one relay connected to the pole of the other relay, with the same order of connection provided in each pair of relays, the remaining pole of the first pair of relays having highest binary weight being connected to said ground terminal, the remaining normally-closed contact of said first pair being connected to the remaining pole of the second pair of relays having the second highest binary weight, the same order of connections being provided between the following relay pairs in the decreasing order of their binary weights, the normally-open contact of each ground-connected relay connected to one of said motor windings, the normally-open contact of each power-source-connected relay being connected to the other of said motor windings, whereby said system senses in opposite numerical directions.

7. Bidirectional means for a binary shaft-positioning system having a plurality of control wires, and a seeking switch including a plurality of double-layer wafer switches each having a peripheral contact connected to a respective control wire and a pair of continuously-engaging contacts on opposite sides, each control wire being identifiable by a different binary weight which is a power of 2, the binary weight being determined by the number of non-switched consecutive angular positions of the respective seeking-switch portion, comprising a power-source terminal and a ground-connected terminal, a plurality of sets of non-polarized relays, wherein each set includes a pair of relays each having at least a single-pole, a normally-open contact, and a normally-closed contact, each set associated with a different control wire and designated by the binary weight of its control wire, one relay in each set connected between said power-source terminal and one continuously-engaging contact of its respective wafer switch, the other relay in each set connected between said ground terminal and the other continuously-engaging contact of its respective wafer switch, a motor having a pair of field windings, wherein separate energization of the field windings is capable of rotating said motor in opposite directions, the normally-open contact of each ground-terminal-connected relay being connected to one of said motor windings, the normally-open contact of each source-terminal-connected relay being connected to the other of said field windings, one relay in each set having its normally-closed contact connected to the pole of the other relay in the set, wherein the connections in each set have the same order, the remaining pole of the set having the highest binary weight being connected to said ground terminal, the remaining normally-closed contact in the highest weight set being connected to the remaining pole in the relay set having second-highest weight, the remaining normally-closed contact in the set of second-highest weight being connected to the remaining pole in the set having third-highest weight, the remaining poles and normally-closed contacts in any remaining sets being connected in the same sequence according to the binary weights of the sets, whereby a bidirectional output can be obtained.

8. Bidirectional means for a binary shaft positioning system having a plurality of control wires and having a seeking switch comprising a plurality of single-pole double-throw switching means with their poles respectively connected to said control wires, each control wire being identifiable by a different binary weight which is a power of 2, the binary weight being determined by the number of non-switched consecutive angular positions of the respective seeking-switch portion, comprising a pair of terminals, a motor having a split-field winding and connecting to one of said terminals, wherein unbalanced energization of said split winding permits bidirectional operation of said motor, a plurality of sets of relays, each set including a pair of relays with each relay having a single pole and double-throw contacts, a set of relays being provided for each control wire and designated by the binary weight of its respective control wire, one relay in each set being connected between one contact of its respective double-throw switch and one of said terminals, other relay of each set being connected between the other contact of its respective double-throw switch and the other of said terminals, each set having the pole of one relay connected to the normally-closed contact of its other relay, the remaining pole in the set of highest binary weight being connected to the terminal opposite from the terminal to which said motor is connected, and the remaining normally-closed contact of each set being connected to the remaining pole in the set of next lower binary weight.

9. Bidirectional means for a binary shaft-positioning system with a plurality of control wires and having a seeking switch that includes a plurality of single-pole double-throw switching means with their poles connected respectivedly to the ends of said control wires, each control wire being identifiable by a different binary weight which is a power of 2, the binary weight being determined by the number of non-switched consecutive angular positions of the respective seeking-switch portion, each of said switching means having opposite contacts engaged sequentially according to the binary sequence provided for its respective control wire, comprising a power-source terminal and a ground connected terminal, a plurality of sets of relays, each set cooperating with a different control wire and being designated by the binary weight of its control wire, each set including a forward relay and a backward relay, each relay including a single pole, a normally-closed contact and a normally-open contact, the forward relay in each set connected respectively between said power-source terminal and one contact of each of said switching means, the backward relay in each set connected respectively between said ground terminal and the other contact of each of said switching means, a motor having a forward winding and a backward winding, wherein energization of said forward winding assists in rotating said motor in a forward manner and energization of said backward winding assists in rotating said motor in a backward direction, said motor being connected to said power-source terminal, the pole of said backward relay in the set of highest binary weight being connected to said ground terminal, each set having the normally-closed contact of the backward relay connected to the pole of its forward relay, the normally-closed contact of the forward relay in each set except the set of lowest binary weight connected to the pole of the backward relay in the set of next lower weight, the normally-open contacts of each backward relay connected to said backward motor winding to allow energization of this winding when engaged by its respective pole, the normally-open contact of each forward relay connected to said forward motor winding to allow energization of this winding when engaged by its respective pole, a control switch that includes a plurality of single-pole double-throw switching means with their poles connected to the opposite ends of said control wires, each of said control switching means having opposite contacts engaged in the same sequence as the seeking switch means, and with opposite contacts respectively connected in the same order to said power-source terminal and said ground-connected terminal.

10. Bidirectional means for a binary shaft positioning system having a plurality of control wires, comprising, a control switch having a plurality of switching elements connected respectively to adjacent ends of said control wires, a seeking switch having the same plurality of like elements connected in the same order to opposite ends of said control wires, each control wire being identifiable by a different binary weight, which is a power of 2, each binary weight being determined by the number of non-switched consecutive positions of the respective control switch, a resistor matrix network having a plurality of series resistors serially connected to the respective control wires, and a plurality of shunt resistors connected between control wires, said shunt resistors including two rows which enclose one series resistor of each control wire, a pair of electron-control means each having at least a cathode, a control grid and a plate, the first enclosed series resistor connected to the wire of highest binary weight and having its opposite sides connected respectively to the control grids of said first and second electron-control means, the other enclosed resistors isolated by said shunt resistors from said first enclosed resistor in the decreasing order of the binary weights of their control wires, the cathodes of said electron-control means connected in reverse order to the grids of the other electron-control means, and a motor having a bidirectional field winding, a B plus source connected serially to said motor, and its windings connected respectively in series with the plates of said first and second electron-control means, whereby said motor is actuated in the direction of shortest numerical sensing to the selected position.

11. Bidirectional means for a binary shaft positioning system having a plurality of control wires, comprising, a control switch having a plurality of switching elements connected respectively to adjacent ends of said control wires, a seeking switch having the same plurality of like elements connected in the same order to opposite ends of said control wires, each control wire being identifiable by a different binary weight, which is a power of 2, each binary weight being determined by the number of non-switched consecutive positions of the respective control switch, a plurality of sets of series resistors, each set of series resistors connected serially with a different control wire and including an intermediate resistor designated by the binary weight of its respective control wire, a plurality of shunt resistors respectively connected between adjacent ends of the intermediate resistors having adjacent binary weights, a pair of electron-control means each having at least two electrodes, control electrodes of said first and second control means respectively connected to opposite sides of the intermediate series resistor of highest binary weight, second electrodes of said first and second electron-control means connected in reverse order from the first-mentioned electrodes to the opposite sides of the intermediate-series resistor of highest binary weight, voltage source operably connected to said electron-control means, and bidirectional driving means connected to the outputs of said electron control means, whereby said bidirectional driving means is controlled in the direction of shortest numerical sensing to the selected position.

12. Bidirectional means for a binary shaft positioning system with a plurality of control wires and having a seeking switch that includes a plurality of single-pole double-throw switching means with their poles connected respectively to the ends of said control wires, each control wire being identifiable by a different binary weight which is a power of 2, the binary weight being determined by the number of non-switched consecutive angular positions of the respective seeking-switch portion, each of said switching means having opposite contacts engaged sequentially according to the binary sequence provided for its respective control wire, with a power-source connected to one contact of each switching means, and a ground connection provided for its other contact, comprising a plurality of resistors, three of said resistors connected serially to each of said control wires, said series-connected resistors designated by the binary weight of their respective control wires, other of said resistors connected in shunt between adjacent ends of the intermediate series resistors having adjacent binary weights, wherein each of said intermediate series resistors is bounded by the ends of shunt resistors which isolate the intermediate series resistors from each other in the consecutive order of their binary weights, first and second triodes, the grids of said first and second triodes connected to opposite ends of the intermediate series resistor of highest binary weight, respective resistance means connected between the cathodes of said first and second triodes and the control grids of said second and first triodes respectively, a plate-voltage source operably connected to the plates of said first and second triodes, and bidirectional driving means connected to the plates of said first and second triodes, whereby bidirectional movement is provided for said shaft positioning system.

References Cited in the file of this patent

UNITED STATES PATENTS 2,676,289 Wulfsberg et al. ---------- Apr. 20, 1954